United States Patent
Yahashi et al.

(10) Patent No.: US 8,770,012 B2
(45) Date of Patent: Jul. 8, 2014

(54) FUEL LEAKAGE DETECTION SYSTEM AND DETECTION METHOD

(75) Inventors: Hiroki Yahashi, Toyota (JP); Eiji Okawachi, Toyota (JP); Tsukuo Ishitoya, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 7 days.

(21) Appl. No.: 13/637,149

(22) PCT Filed: Apr. 30, 2010

(86) PCT No.: PCT/JP2010/057669
§ 371 (c)(1),
(2), (4) Date: Sep. 25, 2012

(87) PCT Pub. No.: WO2011/135711
PCT Pub. Date: Nov. 3, 2011

(65) Prior Publication Data
US 2013/0014855 A1    Jan. 17, 2013

(51) Int. Cl.
*G01M 3/26* (2006.01)
(52) U.S. Cl.
USPC .............................. 73/40; 73/40.5 R; 73/49.2
(58) Field of Classification Search
CPC .. G01M 3/26; H01M 8/04201; Y02E 60/321; Y02E 60/50
USPC .............................. 73/40, 40.5 R, 49.2, 49.3
See application file for complete search history.

(56) References Cited

U.S. PATENT DOCUMENTS 5,369,984 A * 12/1994 Rogers et al. .................. 73/49.2
6,155,099 A * 12/2000 Kobayashi et al. .......... 73/31.05
6,311,547 B1 * 11/2001 Nitecki ............................. 73/40
6,584,825 B2 * 7/2003 Pratt et al. ..................... 73/23.2
6,672,340 B2    1/2004 Mutter

FOREIGN PATENT DOCUMENTS

| JP | 11-500532 A | 1/1999 |
| JP | 2003-269693 A | 9/2003 |
| JP | 2006-214512 A | 8/2006 |
| JP | 2006-308030 A | 11/2006 |
| JP | 2009-036213 A | 2/2009 |
| JP | 2009-117191 A | 5/2009 |
| JP | 2009-121511 A | 6/2009 |

OTHER PUBLICATIONS

International Search Report of PCT/JP2010/057669 mailed Jul. 13, 2010.

* cited by examiner

*Primary Examiner* — Daniel S Larkin
(74) *Attorney, Agent, or Firm* — Kenyon & Kenyon LLP (57) ABSTRACT

A fuel leakage detection system comprises: a communication part for acquiring data relating to fuel filling of an onboard fuel tank from the vehicle side when a fuel supply part is connected to a filler port; a fuel flow rate measurement part, provided on the upstream of the fuel supply part 18, for measuring the flow rate of fuel flowing to the fuel supply part; a fuel flow-out permission part for permitting/stopping the outflow of fuel to the fuel supply part; and a control unit for controlling the fuel flow-out permission part. The control unit further comprises a fuel leakage detection part for detecting fuel leakage when filling fuel to a vehicle based on the fuel flow rate acquired by the fuel flow rate measurement part and on data relating to fuel filling acquired from the vehicle side via the communication part, and the fuel flow out permission part stops outflow of fuel to the fuel supply part when occurrence of fuel leakage is detected by the fuel detection part.

10 Claims, 8 Drawing Sheets

FUEL LEAKAGE DETECTION SYSTEM AND DETECTION METHOD

This is a 371 national phase application of PCT/JP2010/057669 filed 30 Apr. 2010, the contents of which are incorporated herein by reference.

TECHNICAL FIELD

The present invention relates to a fuel leakage detection system, and a detection method thereof, and more particularly to a fuel leakage detection system and to a detection method for detecting fuel leakage when filling fuel into an onboard fuel tank from a filler port of a vehicle via a fuel supply portion at a fuel supply station.

BACKGROUND ART

Conventionally, there is known a fuel cell vehicle in which fuel hydrogen is chemically reacted with oxygen in air to yield electricity, and electricity thus derived is used to drive a motor, or a drive source, to obtain running power. Fuel cell vehicles are also called FC (Fuel Cell) vehicles, and a hydrogen tank for storing hydrogen gas is installed therein. Due to recent research and development relating to this hydrogen tank, hydrogen filling in a relatively short period of time and at a high pressure has become possible.

Fuel cell vehicles installed with abovementioned type of hydrogen tanks need to be refilled with hydrogen at a hydrogen supply station, for example, when hydrogen inside the tank decreases due to consumption by running. In such a case, a hydrogen supply nozzle is air-tightly connected to a filler port provided on the body of a fuel cell vehicle when it is at a stop at a hydrogen supply station.

Here, in the case where hydrogen leakage occurs while hydrogen is being filled into a vehicle, it is desirable that the hydrogen filling is immediately stopped to ensure safety, since hydrogen is a flammable gas.

As a related prior art document, a hose fitting for hydrogen filling having a built in emergency shutoff valve inside a nipple provided at an end portion of a filling hose connecting a hydrogen gas supply source and a filling tank is disclosed in Japanese Patent Laid-Open Publication No. 2009-121511 (Patent document 1). This emergency shutoff valve for hydrogen filling hose fitting is constructed such that the communication path is shut off when the pressure on the hydrogen gas supply source become lower than the hydrogen gas pressure inside the filling tank, and at least one of either the nipple or the emergency shutoff valve is constructed of non-metal material.

As another prior art document, a system state judgment method for a fuel cell system is disclosed in Japanese Patent Laid-Open Publication 2009-117191. This system state judgment method applies to a fuel cell system comprising: a fuel shutoff mechanism provided in a fuel path for supplying fuel to a fuel cell from a fuel tank; pressure detection means provided downstream of the fuel shutoff mechanism; and a pressure state judgment means for judging the pressure state based on information from the pressure detection means. The method includes the steps of: detecting pressure change, which is a step for detecting a pressure change value per a certain time period within a predetermined time after the shutoff mechanism has been shifted to a communicating state from a shutoff state by the pressure detection means; and judging an abnormal state when the pressure change value per the certain time period detected by the pressure detection means is less than the predetermined pressure change value, and therefore judging by the pressure state judgment means that the fuel inside the fuel tank is less than a predetermined volume. According to this document, the judgment of abnormal state, such as the fuel level decrease and valve leakage, can be quickly performed with one pressure detection mechanism.

PRIOR ART REFERENCES

Patent documents

[Patent document 1] Japanese Patent Laid-Open Publication No. 2009-121511
[Patent document 2] Japanese Patent Laid-Open Publication No. 2009-117191

In the abovementioned hydrogen supply station, hydrogen filling is assumed to be performed on fuel cell vehicles of various types and manufacturers. In that case, despite the fact that the hydrogen supply nozzle on the station side and the filler port on the vehicle side are standardized, it is difficult to accurately detect hydrogen leakage during hydrogen filling without considering the situation and condition on the vehicle side if the pressure loss and the like in the hydrogen filling pipe between the filler port and the fuel tank differ depending on vehicle type and manufacturer. Accordingly, it is not possible to accurately detect hydrogen leakage which may occur when filling hydrogen to a vehicle at a hydrogen supply station using techniques described in the abovementioned patent documents 1 and 2.

Therefore, an object of the present invention is to provide a fuel leakage detection system that allows accurate and early detection of fuel leakage that may occur when filling fuel to various types of vehicles at a fuel supply station, and a detection method therefor.

DISCLOSURE OF THE INVENTION

One aspect of a fuel leakage detection system according the present invention is a fuel leakage detection system provided in a fuel supply station for detecting fuel leakage when filling fuel into an onboard fuel tank from a filler port of a vehicle via a fuel supply part, comprising: a communication part for acquiring data relating to fuel filling of the onboard fuel tank from the vehicle side when the fuel supply part is connected to the filler port; a fuel flow rate measurement part, provided in a fuel supply path part on the upstream of the fuel supply part, for measuring a flow rate of fuel flowing to the fuel supply part; a fuel flow-out permission part for permitting/stopping the outflow of fuel to the fuel supply part; and a control unit for controlling the fuel flow-out permission part, wherein the control unit further comprises a fuel leakage detection part for detecting fuel leakage when filling fuel to the vehicle based on the fuel flow rate acquired by the fuel flow rate measurement part and on data relating to fuel filling acquired from the vehicle side via the communication part, and the fuel flow-out permission part stops outflow of fuel to the fuel supply part when fuel leakage is detected by the fuel leakage detection part.

In the fuel leakage detection system according to the present invention, the data relating to fuel filling may comprise a tank temperature detected during fuel filling by a temperature sensor provided at the onboard fuel tank, and a tank pressure detected during fuel filling by a pressure sensor provided in the vicinity of an inlet of the onboard fuel tank, and the tank temperature and tank pressure may be transmitted to the communication part via an onboard transmission part.

In this case, the fuel leakage detection part may derive an estimated fill volume of fuel based on the tank temperature and tank pressure, and it may be judged that fuel leakage has occurred if a difference between the fuel flow rate measured by the fuel flow rate measurement part and the estimated fill volume exceeds a predetermined volume difference threshold value.

Also, in the fuel leakage detection system according to the present invention, the device may further comprise a first pressure sensor for detecting a fuel supply pressure during fuel filling on the upstream side of the fuel supply part, and the data relating to fuel filling may include a tank pressure detected by a second pressure sensor provided in the vicinity of the inlet of the onboard fuel tank such that it may be judged by the fuel leakage detection part that fuel leakage has occurred if a differential pressure between a detected value of the first pressure sensor and a detected value of the second pressure sensor is less than a predetermined differential pressure threshold value.

In this case, the predetermined differential pressure threshold value may be a value transmitted from the vehicle side which is specific to that vehicle, and may be considered as being equal to a pressure loss arising in a pipe between the filler port and the onboard fuel tank.

A fuel leakage detection method according to another aspect of the present invention is a fuel leakage detection method for detecting fuel leakage when filling fuel into an onboard fuel tank from a filler port of a vehicle via a fuel supply part at a fuel supply station, comprising the steps of: acquiring data relating to fuel filling of the onboard fuel tank from the vehicle side by communication when the fuel supply part is connected to the filler port; acquiring a fuel flow rate toward the fuel supply part that is measured by a fuel flow rate measurement part provided on a fuel supply path on the upstream side of the fuel supply part; detecting fuel leakage when filling fuel into a vehicle based on the fuel flow rate and data relating to the fuel filling; and stopping fuel outflow to the fuel supply part when occurrence of the fuel leakage has been detected.

In the fuel leakage detection method according to the present invention, the data relating to fuel filling may include a tank temperature and tank pressure of the onboard fuel tank during the fuel filling, and the tank temperature and tank pressure may be transmitted to the fuel supply station side from the vehicle side.

In this case, the step of detecting the fuel leakage may derive an estimated fuel fill volume based on the tank temperature and tank pressure, and judge that fuel leakage has occurred when a difference between the fuel low rate and the estimated fill volume exceeds a predetermined volume difference threshold value.

Also, in the fuel leakage detection method according to the present invention, the method may further comprise a step for acquiring a fuel supply pressure during fuel filling detected on the upstream side of the fuel supply part, and the data relating to fuel filling may include a tank pressure during fuel filling that is detected in the vicinity of an inlet port of the onboard fuel tank, such that the step for detecting fuel leakage judges that fuel leakage has occurred when the difference between the fuel supply pressure and the tank pressure is less than a predetermined differential pressure threshold value.

In this case, the predetermined differential pressure threshold value may be a value transmitted from the vehicle side which is specific to that vehicle, and may be considered as being equal to a pressure loss arising in a pipe between the filler port and the onboard fuel tank.

The fuel leakage detection system and detection method according to the present invention is constructed such that when the fuel supply part of the fuel station is connected to the filler port of a vehicle, data relating to the fuel filling of the onboard fuel tank of the vehicle is acquired through communication from the vehicle side, and occurrence of fuel leakage is detected based on this data and the fuel flow rate of fuel flowing out from the abovementioned fuel supply part. This allows setting of the estimated fill volumes and the threshold values for judging fuel leakage detection to appropriate values in accordance with each vehicle in the case of various types of vehicles having different pressure losses and the like arising in the pipes between the filler port and the vehicle fuel tank, which therefore makes it possible to detect fuel leakage while filling fuel into a vehicle at a fuel supply station accurately and at an early stage.

MODES FOR CARRYING OUT THE INVENTION

Modes for carrying out the present invention will be described in detail below with reference to the attached drawings. Specific shapes, materials, numerical values, directions, and the like in the description are provided as illustrations to facilitate understanding of the present invention, and therefore may be arbitrarily altered to fit the application, purpose, specifications, and the like.

While description will be given on the assumption that the fuel to be detected by the fuel leakage detection system, which is an embodiment of the present invention, is hydrogen, the present invention is applicable to other gaseous fuels such as natural gas. Also, the vehicle to be filled with hydrogen may be a fuel cell vehicle provided with a fuel cell system that chemically reacts hydrogen and oxygen to generate electricity, or may be a vehicle having an internal combustion engine as a power source that combusts hydrogen.

Figure 1:
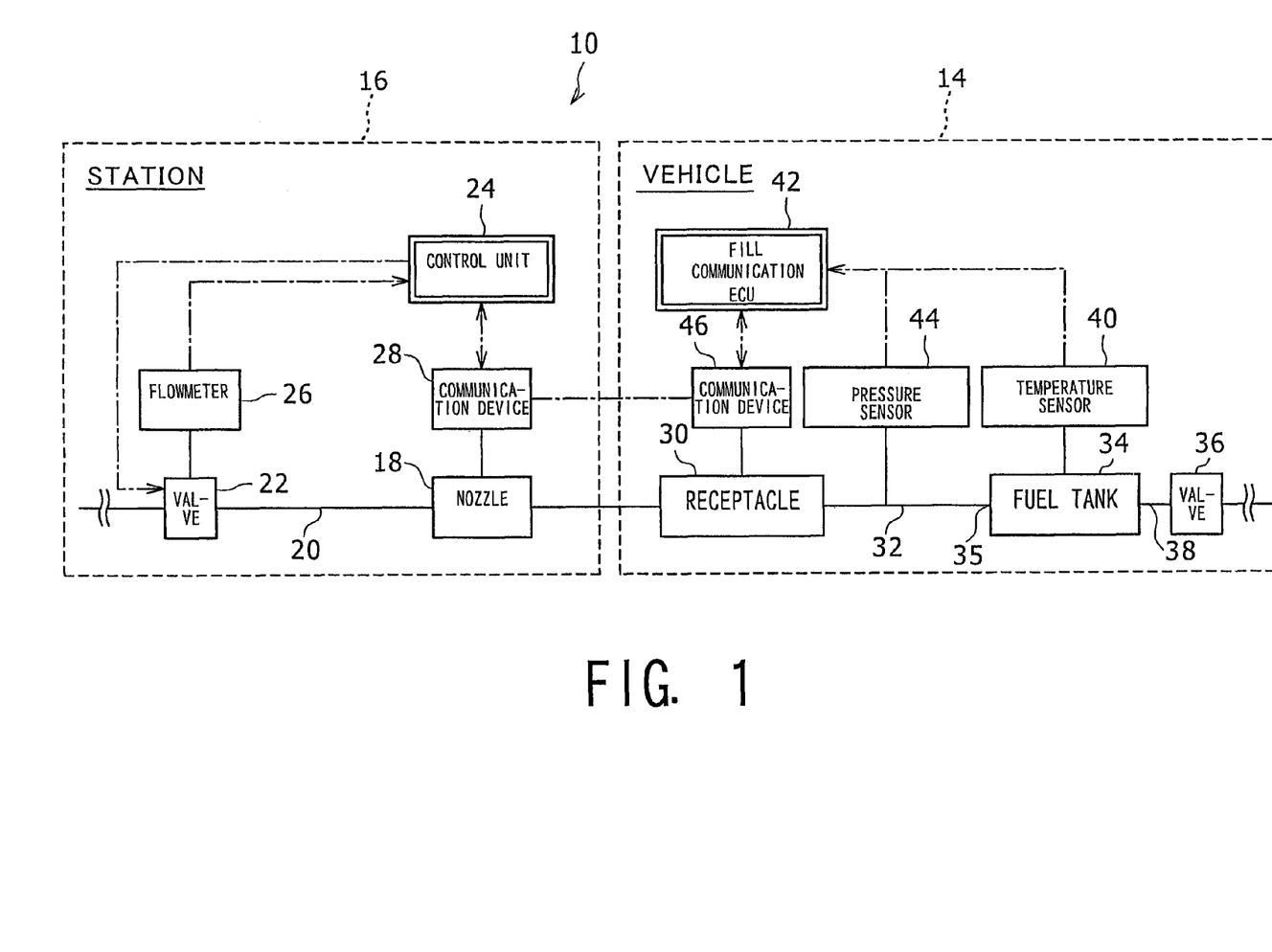
FIG. 1 is a block diagram showing a schematic configuration of a fuel leakage detection system of a first embodiment of the present invention.

FIG. 1 is a block diagram showing a schematic configuration of a fuel leakage detection system 10 of a first embodiment of the present invention. As shown in the figure, the fuel leakage detection system 10 is provided in a hydrogen supply station (hereafter, it maybe simply referred to as the station) 16 which is a facility or an equipment for filling hydrogen into a vehicle 14.

A nozzle (fuel supply part) 18 for supplying fuel to the vehicle 14 is provided in the hydrogen supply station 16. A hydrogen supply path 20 that stretches from a hydrogen storage tank, not shown, is connected to the nozzle 18. A first open-close valve 22 is provided on the upstream side of the nozzle 18 with respect to the hydrogen flow direction in the hydrogen supply path 20. This first open-close valve 22 functions to either permit or stop hydrogen from flowing out to the nozzle 18 from the hydrogen storage tank via the hydrogen supply path 20. While the first open-close valve 22 is preferably constructed by a solenoid valve, it may also be a valve that opens and closes by drive of a motor. Further, the first open-close valve 22 opens or closes in accordance with the signals from a control unit 24 so as to either permit or stop the outflow of hydrogen from the hydrogen storage tank to the nozzle 18.

The hydrogen supply path 20 connected to the nozzle 18 may be constructed by a flexible rubber hose, or the like, for example, to facilitate its connection to the vehicle 14, and the rubber hose may be connected to a metallic pipe connected to the first open-close valve 22.

A first flowmeter (fuel flow rate measurement part) 26 is connected to the first open-close valve 22. The first flowmeter 26 is for measuring the flow rate of hydrogen flowing in the hydrogen supply path 20 toward the nozzle 18. The hydrogen flow rate detected by the first flowmeter 26 is input to the control unit 24 which is then used to calculate the integrated value of hydrogen flow rate having flowed out from the nozzle 18.

Further, a first communication device (communication part) 28 is provided at the hydrogen supply station 16. The first communication device 28 communicates between the vehicle 14 when the nozzle 18 is connected to the vehicle 14 for hydrogen filling, and functions to receive data relating to hydrogen filling to the vehicle 14. The first communication device 28 is preferably an infrared communication device, for example. However, the first communication device 28 may also be of a wireless type communication other than the infrared communication, or may be of a type where a wired communication circuit which is formed between it and the vehicle 14 via the nozzle 18.

The control unit 24 may comprise a micro computer including a CPU (or MPU), a memory, input/output ports, and the like, and has the function to execute the fuel leakage detection routine described hereinafter. Detection value of the first flowmeter 26 and data relating to hydrogen filling received from the vehicle 14 by the first communication device 28 are input to the control unit 24. Further, signals for controlling opening and closing of the first open-close valve 22 are output from the control unit 24.

Meanwhile, the vehicle 14 is provided with a receptacle 30 and an onboard fuel tank (hereafter, simply referred to as the fuel tank) 34 connected to the receptacle 30 via a hydrogen filling pipe 32. The receptacle 30 is a filler port through which hydrogen is supplied to the fuel tank 34 of the vehicle 14 by the abovementioned nozzle 18 being air-tightly connected to the receptacle 30.

The fuel tank is a high-pressure tank which can be filled with hydrogen of 70 MPa, for example. A hydrogen supply pipe 38 provided with an open-close valve 36 is connected to the fuel tank 34, and hydrogen is supplied to the fuel cell system, and the like, not shown, when the abovementioned open-close valve 36 is opened.

A temperature sensor 40 is disposed on the outer peripheral surface, for example, of the fuel tank 34. The temperature sensor 40 has the function to detect the tank temperature when filling hydrogen into the fuel tank 34. The tank temperature detected by the temperature sensor 40 is to be sent to a filling communication ECU 42.

Further, a pressure sensor 44 is disposed in the hydrogen filling pipe 32 between the receptacle 30 and the fuel tank 34. The pressure sensor 44 has the function to detect the tank pressure around the inlet port 35 of the fuel tank 34 when filling hydrogen into the fuel tank 34. The tank pressure detected by the pressure sensor 44 is to be sent to the filling communication ECU 42. The vehicle 14 is provided with a second communication device (onboard transmission part) 46 for communicating with the first communication device 28 of the hydrogen supply station 16. When filling hydrogen into the fuel tank 34 via the receptacle 30, the second communication device 46 functions to transmit various values detected by the temperature sensor 40 and the pressure sensor 44, in other words, the tank temperature and the tank pressure, obtained from the filling communication ECU 42 to the first communication device 28 of the station 16 as data relating to hydrogen filling. The second communication device 46 employs the same communication system as the first communication device 28.

The filling communication ECU may comprise a micro computer including a CPU (or MPU), a memory, input/output ports, and the like. The filling communication ECU has the function to transmit the tank temperature and the tank pressure received from the temperature sensor 40 and the pressure sensor 44 to the station 16 by the second communication device 46. The filling communication ECU also has the function to monitor the hydrogen filling status of the fuel tank 34 based on the tank temperature and the tank pressure.

In the above description, the nozzle 18, the hydrogen supply path 20, the first open-close valve 22, the control unit 24, the first flowmeter 26, and the first communication device 28 correspond to the fuel supply part, the fuel supply path, the fuel outflow permission part, the control unit, the fuel flow rate measurement part, and the communication part, respectively.

Figure 2:
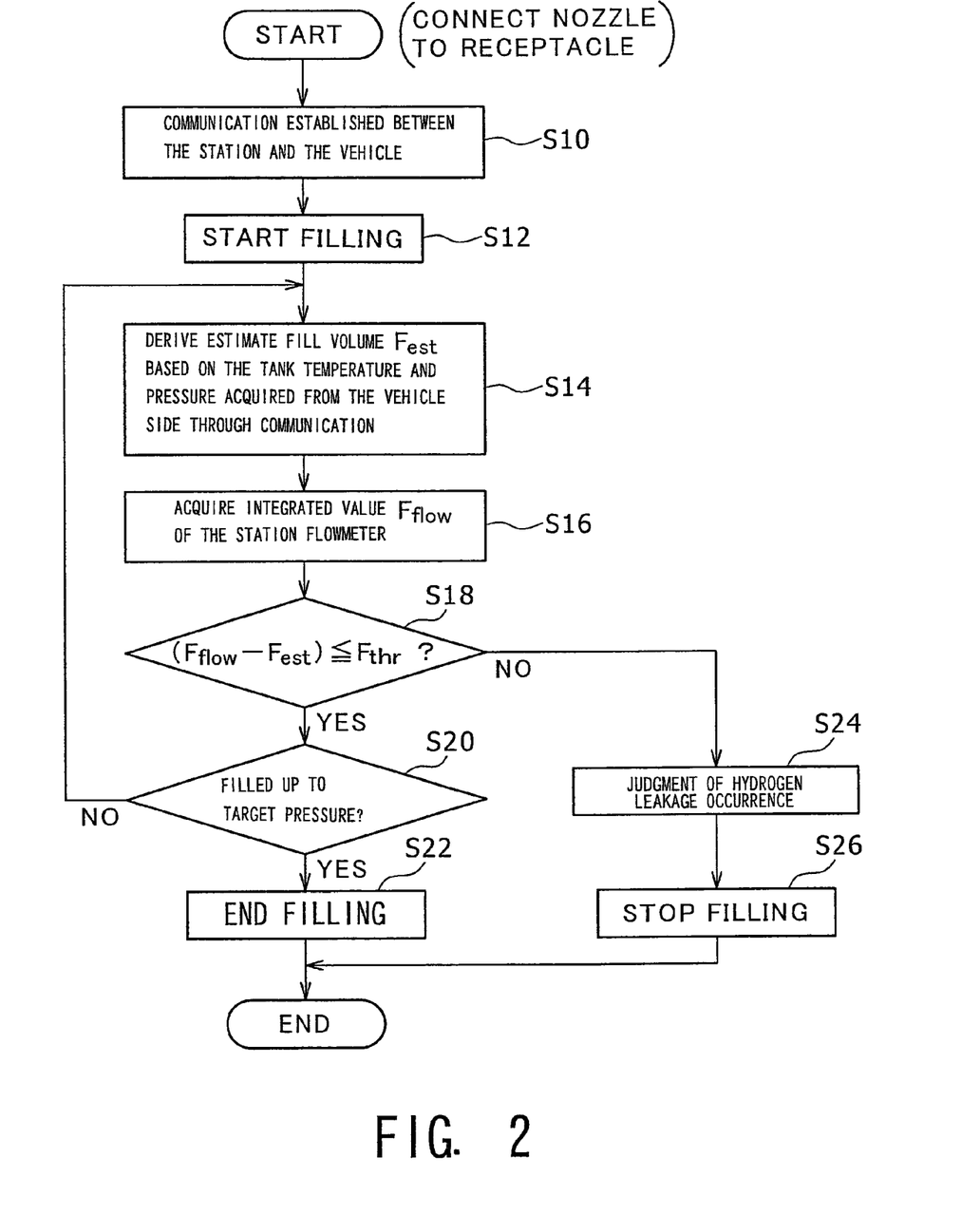
FIG. 2 is a flowchart showing the fuel leakage detection routine processing procedures implemented in the control unit of the fuel leakage detection system in FIG. 1.
Figure 3:
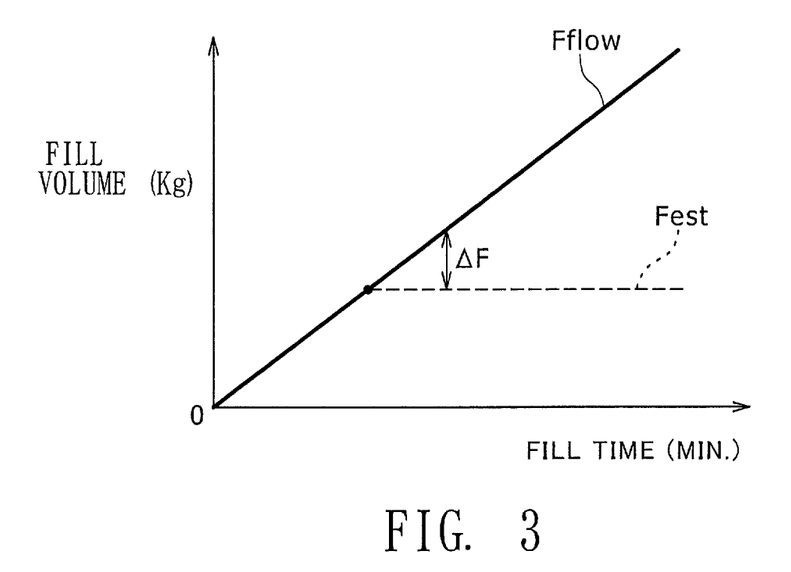
FIG. 3 is a graph for describing the relationships among the fill time, fuel fill volume, and estimated fill volume in the fuel leakage detection routine shown in FIG. 2.

Next, the operation of the fuel leakage detection system 10 configured as mentioned above will be described with reference to FIGS. 2 and 3. FIG. 2 is a flowchart showing the fuel leakage detection routine processing procedures implemented in the control unit 24. FIG. 3 is a graph for describing the relationships among the fill time, fuel fill volume, and estimated fill volume in the fuel leakage detection routine shown in FIG. 2. It is to be noted that, while fuel leakage detection in this embodiment is implemented through software processing, a portion thereof may be substituted by a hardware element.

Referring to FIG. 2, when the nozzle 18 is connected air-tightly to the receptacle 30 of the vehicle 14, the fuel leakage detection routine starts in the control unit 24. It is possible to detect whether or not the nozzle 18 has been tightly fitted inside the receptacle 30 by a noncontact proximity sensor of an optical or a dielectric type, for example, or a contact sensor and the like.

When the nozzle 18 is connected to the receptacle 30, the control unit 24 first, in step S10, establishes communication between the first communication device 28 of the station 16 and the second communication device 46 of the vehicle 14. Accordingly, data relating to hydrogen filling of the fuel tank 34 of the vehicle 14 becomes receivable via the first communication device 28.

Next, in step S12, hydrogen filling to the vehicle 14 starts in accordance with switch operations by a station operator, a vehicle user, and the like. Specifically, the first open-close valve 22 is opened to let hydrogen flow out from the nozzle 18 via the hydrogen supply path 20. Hydrogen that has flowed out from the nozzle 18 is filled into the fuel tank 34 through the receptacle 30 and then the hydrogen filling pipe 32.

Next, in step S14, an estimated fill volume Fest of the fuel tank 34 is derived based on the tank temperature and tank pressure acquired from the vehicle 14 side by communication. Here, the relationship between the tank temperature plus the tank pressure and the tank internal hydrogen fill volume is stored in the memory inside the control unit 24 in the form of a table or a map as data obtained from actual tests, simulations and the like, and this data is referenced to calculate the estimated fill volume at that point through a table lookup operation and the like.

Alternatively, the procedures may be configured such that the abovementioned data showing the relationship between the tank temperature plus the tank pressure and the tank internal hydrogen fill volume is stored in the memory inside the filling communication ECU of the vehicle 14 as data specific to that vehicle, and such that the estimated fill volume Fest derived by referencing this data is transmitted to the control unit 24 of the station 16 from the vehicle by communication.

Next, in subsequent step S16, the control unit 24 acquires the integrated value Fflow of hydrogen flow rate detected by the first flowmeter 26 of the station 16. Then, in step S18, it is judged whether or not the volume difference ΔF, which is obtained by subtracting the abovementioned estimated fill volume Fest from the abovementioned integrated value Fflow, is at a predetermined volume difference threshold value Fthr or less. Here, the volume difference threshold value Fthr is preferably set at an appropriate value such that a detection error by the first flowmeter 26 is not judged as fuel leakage, which may be a variable value according to the abovementioned tank temperature and the like or may be a constant value, while taking into consideration the tank temperature and the tank pressure and the like.

If the volume difference ΔF is less than or equal to the volume difference threshold value Fthr in step S18, in the following step S20 it is determined whether or not hydrogen has been filled to the target pressure, and if the judgment is negative, the respective steps S14 through S20 above are repeatedly executed until the target pressure is reached. If it is determined that the target pressure has been reached in step S20, hydrogen filling is ended by closing the first open-close valve 22 in step S22.

While it has been set to end hydrogen filling when the tank pressure has reached the target pressure in steps S20 and S22 above, the present invention is not limited thereto, and it is possible to end hydrogen filling when the integrated value by the first flowmeter 26 has reached a target fill volume which is set in advance.

On the other hand, if it is determined that the volume difference ΔF is above the volume difference threshold value in step S18 above, it is determined in the following step S24 that hydrogen leakage has occurred, and the first open-close valve 22 is immediately closed in step S26 to stop hydrogen filling. In this case, the occurrence of hydrogen leakage is preferably notified by an alarm, such as sound, display, and the like.

FIG. 3 shows by a graph the fuel leakage detection according to the routine in FIG. 2. The axis of abscissas shows the filling time and the axis of ordinate shows the fill volume. The solid line illustrates the state of hydrogen fill volume Fflow increasing with the lapse of time once hydrogen filling starts. On the other hand, the estimated fill volume Fest shown by a dashed line is a value calculated based on the tank temperature and the tank pressure at the respective moments. When the volume difference ΔF between the hydrogen-fill volume Fflow measured by the first flowmeter 26 and the estimated fill volume Fest becomes greater than a predetermined volume difference threshold value Fthr, it is determined that hydrogen leakage has occurred.

According to the fuel leakage detection system 10 of the present embodiment, it is possible to accurately derive the estimated fill volume Fest and the volume difference threshold value Fthr for judging fuel leakage detection of various vehicles 14 with different pressure losses and the like arising in the hydrogen filling pipe 32 leading from the receptacle 30 to the fuel tank 34 as appropriate values in accordance with tank temperature, tank pressure, and the like of the vehicle 14, and as a result, it is possible to more accurately detect fuel leakage when filling hydrogen into a vehicle 14 at a hydrogen supply station 16 at an early stage. That is, safety of a hydrogen filling operation at the hydrogen supply station improves.

Figure 4:
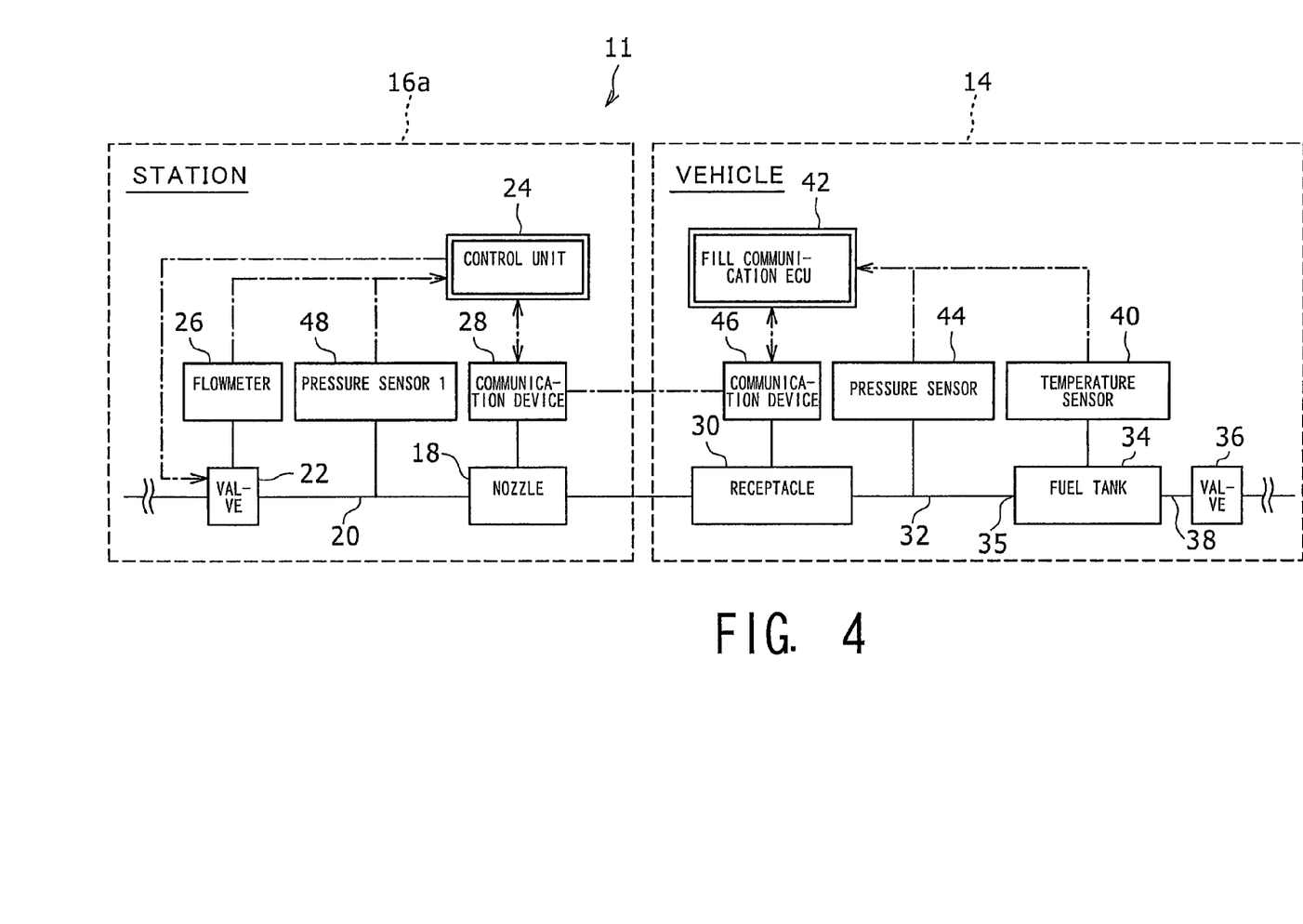
FIG. 4 is a block diagram showing a schematic configuration of the fuel leakage detection system of a second embodiment according to the present invention.
Figure 5:
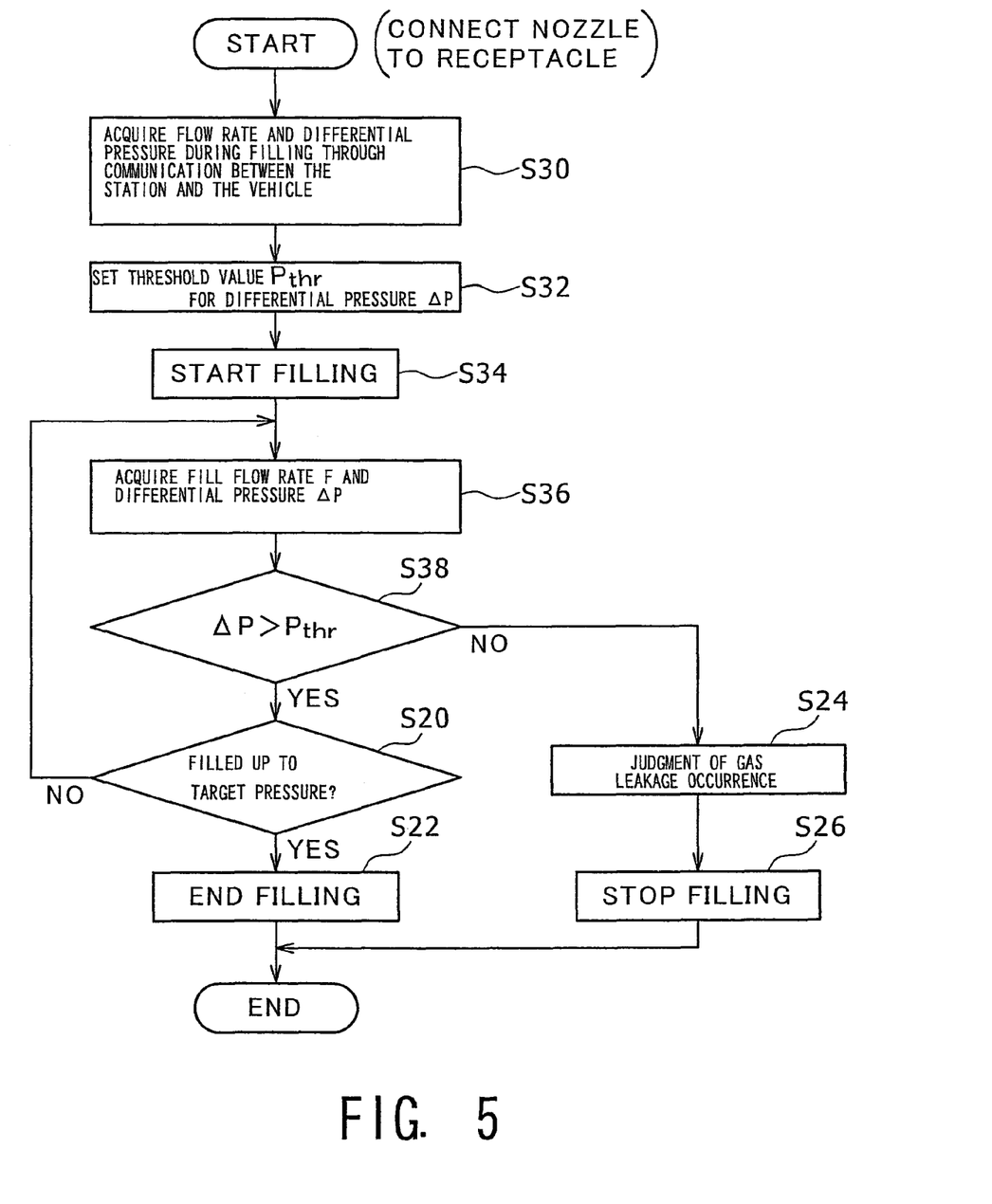
FIG. 5 is a flowchart showing the fuel leakage detection routine processing procedures implemented in the control unit of the fuel leakage detection system shown in FIG. 4.
Figure 6:
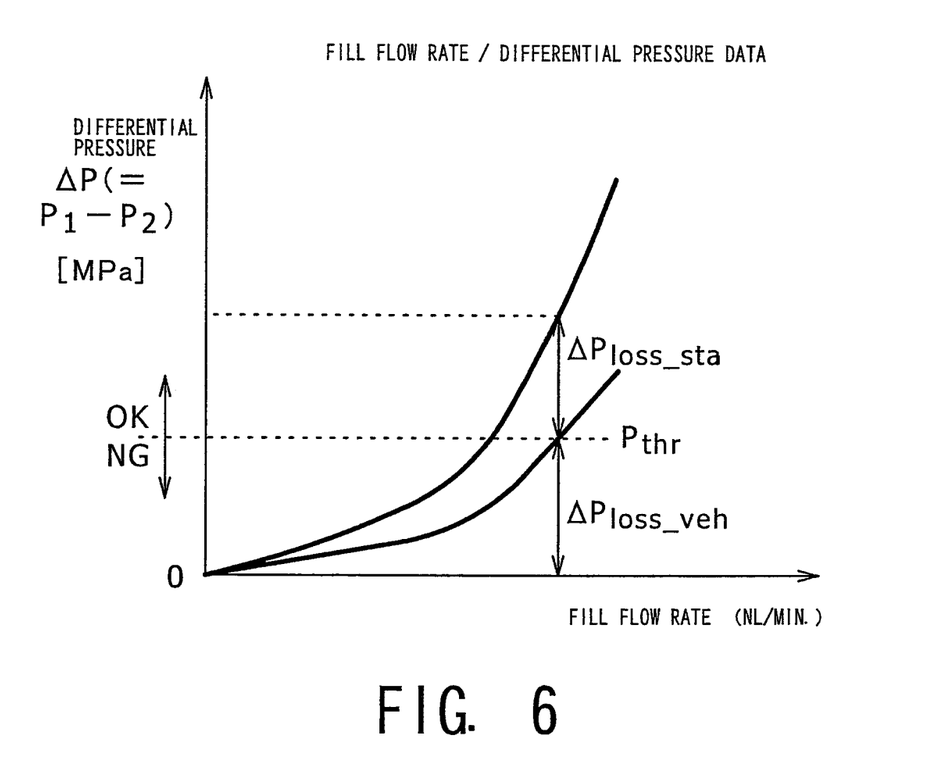
FIG. 6 is a graph for describing the relationships among the fuel fill flow rate, differential pressure, and the differential pressure threshold value in fuel leakage detection routine shown in FIG. 2.

Next, a fuel leakage detection system 11 of the second embodiment will be described with reference to FIGS. 4 through 6. FIG. 4 is a block diagram showing a schematic configuration of the fuel leakage detection system 11. FIG. 5 is a flowchart showing the fuel leakage detection routine processing procedures implemented in the control unit 24 of the fuel leakage detection system 11 shown in FIG. 4. FIG. 6 is a graph for describing the relationships among the fuel fill volume, differential pressure, and the differential pressure threshold value in the fuel leakage detection routine shown in FIG. 2.

Since the fuel leakage detection system 11 of the present embodiment has substantially the same configuration as the fuel leakage detection system 10 of the abovementioned first embodiment, description of the same or similar components will be incorporated herein by using the same or similar reference numeral.

As shown in FIG. 4, the fuel leakage detection system 11 is different from the abovementioned fuel leakage detection system 10 only in that it is further provided with a pressure sensor 48 for detecting the hydrogen pressure in the hydrogen supply path 20 between the nozzle 18 and the first open-close valve 22 in the station 16a, and rest of the components are the same as those of the abovementioned fuel leakage detection system 10. Hereunder, the pressure sensor on the station 16a side will be referred to as a first pressure sensor 48 and the pressure sensor on the vehicle 14 side will be referred to as a second pressure sensor 44. The detection values by the first pressure sensor 48 are input to the control unit 24 to be used for the judgment of the fuel leakage detection routine.

Next, the operation of the fuel leakage detection system 11 will be described with reference to FIG. 5. Fuel leakage detection routine processing starts in the control unit 24 when the nozzle 18 is connected air-tightly to the receptacle 30 of the vehicle 14.

When the nozzle 18 is connected to the receptacle 30, first, the control unit 24 carries out communication between the first communication device 28 of the station 16a and the second communication device 46 of the vehicle 14 in step S30, and acquires data relating to the flow rate and differential pressure during hydrogen filling as data relating to hydrogen filling of the fuel tank 34. Here, data relating to the flow rate and differential pressure during hydrogen filling refers to data showing the relationship between the filling flow rate (NL (normal liter)/minute) and the differential pressure ΔP (MPa) obtained by subtracting the detection value P2 of the second pressure sensor 44 of the vehicle 14 from the detection value P1 of the first pressure sensor 48 of the station 16a, as shown in FIG. 3. This data is obtained in advance by actual tests, simulations, and the like, and stored in the memory inside the filling communication ECU 42 in the form of a table or a map, which is then acquired by the control unit 24 through communication and enables acquisition of the pressure loss (hereafter referred to as the vehicle-side pressure loss) ΔPloss_veh in the hydrogen filling pipe 32, which is a value specific to the vehicle 14.

While the nozzle 18 and the receptacle 30 used are standardized and therefore there is no dispersion in pressure loss, hydrogen filling pipes 32 leading to the fuel tank 34 from the receptacle 30 have different designs depending on the vehicle manufacturers and vehicle types, and so the vehicle pressure loss ΔPloss_veh becomes a value specific to the vehicle according to the difference in pressure loss arising inside this pipe 32.

In the subsequent step S32, the differential pressure threshold value Pthr relating to the differential pressure ΔP is set by the control unit 24. Specifically, the differential pressure threshold value Pthr is set to the abovementioned vehicle side pressure loss ΔPloss_veh.

Further, in the following step S34, hydrogen filling to the vehicle 14 starts in accordance with a switch operation by a station operator, a vehicle user, and the like. Specifically, the first open-close valve 22 is opened to let hydrogen flow out from the nozzle 18 via the hydrogen supply path 20. Hydrogen that has flowed out from the nozzle 18 is filled to the fuel tank 34 from the receptacle 30 via the hydrogen filling pipe 32.

Next in step S36, the hydrogen-fill flow rate F and the differential pressure ΔP are acquired. Here, an integrated value of the flow rates measured by the first flowmeter 26 is used as the hydrogen-fill flow rate F. Also, the differential pressure ΔP is obtained by subtracting the detected value P2 of the second pressure sensor 44 from the first detected value P1 of the first pressure sensor 48 as mentioned above.

Then, in the following step S38, it is judged by the control unit 24 whether or not the differential pressure AP obtained above is greater than the predetermined differential pressure threshold Pthr. Here, referring to the graph in FIG. 6, the filling flow rate F is shown on the axis of abscissas and the differential pressure ΔP is shown on the axis of ordinate, respectively. The differential pressure threshold value Pthr is set to the vehicle side pressure loss ΔPloss_veh.

As shown by a solid line in FIG. 6, while there is a relationship such that the differential pressure ΔP sharply increases as the filling flow rate F increases, the differential pressure ΔP is equivalent to a value obtained by adding the vehicle-side pressure loss ΔPloss_veh and the pressure loss on the station 16a side (hereafter referred to as the station-side pressure loss) ΔPloss_sta. The station-side pressure loss ΔPloss_sta is a pressure loss arising in the hydrogen supply path 20 anterior to the nozzle 18 when hydrogen filling is being performed with the nozzle 18 being air-tightly connected to the receptacle 30. Here, the station-side pressure loss ΔPloss_sta disappears (that is, becomes a zero) when hydrogen leakage occurs in the connection part between the nozzle 18 and the receptacle 30, consequently meaning that it is only necessary to set the differential pressure threshold value Pthr, which is a fuel leakage judgment threshold value for the abovementioned differential pressure ΔP, to the vehicle-side pressure loss ΔPloss_veh.

If the abovementioned differential pressure ΔP is greater than the differential pressure threshold value Pthr in step S38 above, it is determined in step S20 whether or not hydrogen has been filled into the fuel tank 34 up to the target pressure, and after a negative judgment here, each of the abovementioned steps S36, S38, and S20 are repeatedly executed until the target pressure is reached. Then, if it is determined in step S20 that hydrogen has been filled to the target pressure, the first open-close valve 22 is closed in step S22 to end the hydrogen filling.

On the other hand, if it is determined in step S38 that the Abovementioned differential pressure ΔP is less than the differential pressure threshold value Pthr, it is determined in the following step S24 that hydrogen leakage has occurred, and the first open-close valve 22 is immediately closed in step S26 to stop hydrogen filling. In this case, preferably, occurrence of hydrogen leakage is notified by voice, display, and the like.

According to the fuel leakage detection system 11 of the present embodiment, it is possible to set the differential pressure threshold value Pthr for judging fuel leakage detection to a suitable a value for the vehicle 14, wherein various vehicles 14 have different pressure losses and the like arising in the hydrogen filling pipe 32 stretching between the receptacle 30 to the fuel tank 34, and consequently it becomes possible to detect fuel leakage when filling hydrogen into a vehicle 14 at a hydrogen supply station 16a more accurately and at an early stage. That is, safety of a hydrogen filling operation at the hydrogen supply station 16a improves. Further, there is an advantage that the leakage location can be easily specified in the case of hydrogen leakage by monitoring the pressure during hydrogen filling with a plurality of pressure sensors 48, 44 provided on the station side 16a and the vehicle 14 side.

Figure 7:
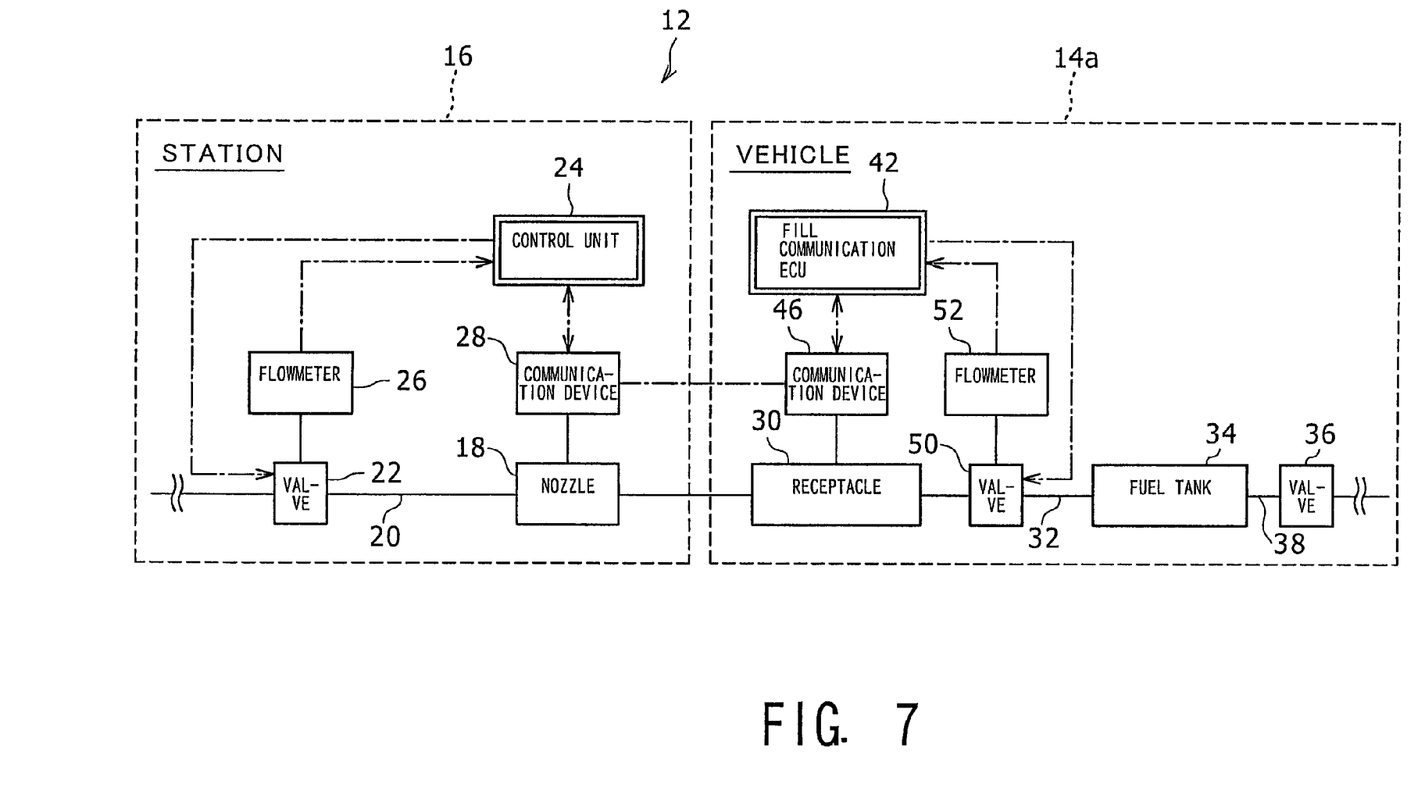
FIG. 7 is a block diagram showing a schematic configuration of the fuel leakage detection system of a third embodiment of the present invention.
Figure 8:
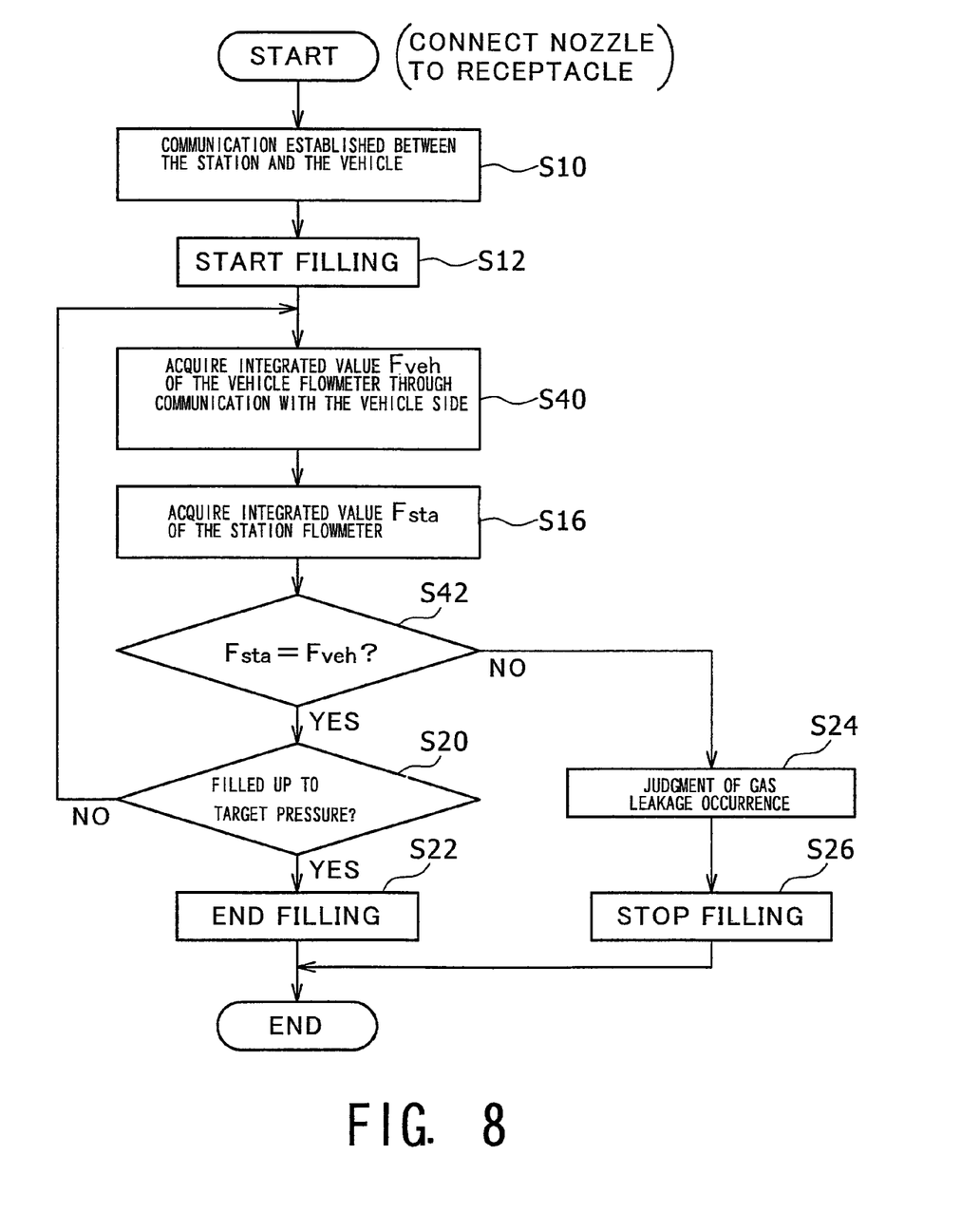
FIG. 8 is a flowchart showing the fuel leakage detection routine processing procedures implemented in the control unit of the fuel leakage detection system shown in FIG. 7.

Next, a fuel leakage detection system according to the third embodiment will be described with reference to FIGS. 7 and 8. FIG. 7 is a block diagram showing a schematic configuration of the fuel leakage detection system 12 of the third embodiment. FIG. 8 is a flowchart showing the fuel leakage detection routine processing procedures implemented in the control unit 24 of the fuel leakage detection system 12 shown in FIG. 7. The fuel leakage detection system 12 of the present embodiment has substantially the same configuration as the fuel leakage detection system 10 of the abovementioned first embodiment, and therefore the same or similar components will be denoted with the same or similar reference numerals and description thereof will be incorporated herein by reference.

As shown in FIG. 7, a second open-close valve 50 is provided in the hydrogen filling pipe 32 connecting the receptacle 30 and the fuel tank 34 of the vehicle 14a to which the fuel leakage detection system 12 of the third embodiment is applied. The second open-close valve 50 is controlled such that it opens or closes in accordance with signals from the filling communication ECU 42. Also, a second flowmeter 52 is provided on the second open-close valve 50. The second flowmeter 52 has the function to measure the flow rate of hydrogen flowing inside the hydrogen filling pipe 32 toward the fuel tank 34.

The hydrogen flow rate measured by the second flowmeter 52 is transmitted to the filling communication ECU 42 to calculate the integrated value Fveh which is the hydrogen fill volume of the fuel tank 34. Then, this integrated value Fveh is transmitted to the station 16 via the second communication device 46 during hydrogen filling. Other components are similar to those of the fuel leakage detection system 10 of the abovementioned first embodiment.

Next, operation of the fuel leakage detection system 12 will be described. Referencing FIG. 8, fuel leakage detection routine processing starts in the control unit 24 when the nozzle 18 is air-tightly connected to the receptacle 30 of the vehicle 14a.

When the nozzle 18 is connected to the receptacle 30, the control unit 24 first, in step S10, establishes communication between the first communication device 28 of the station 16 and the second communication device 46 of the vehicle 14. As a result, data relating to hydrogen filling of the fuel tank 34 of the vehicle 14a, specifically, the integrated value Fveh which is the hydrogen fill volume of the fuel tank 34, becomes receivable by the control unit 24 via the first communication device 28.

Next, in step S12, hydrogen filling to the vehicle 14 starts in accordance with switch operation of a station operator, a vehicle user, and the like. Specifically, the first open-close valve 22 is opened to let hydrogen flow out from the nozzle 18 via the hydrogen supply path 20. Also, on the vehicle 14a side, the second open-close valve 50 is opened in accordance with signals from the filling communication ECU 42. Accordingly, hydrogen that has flowed out from the nozzle 18 of the station 16 is filled into the fuel tank 34 through the receptacle 30 and the hydrogen fill pipe 32.

Next, in step S40, the abovementioned integrated value Fveh is acquired from the vehicle 14a side through communication. Then, in step S16, the integrated value Fsta of hydrogen flow rate detected by the first flowmeter 26 is acquired.

Next, in step S42, it is determined whether or not the abovementioned integrated value Fveh acquired from the vehicle 14a side is equal to the integrated value Fsta of hydrogen flow rate on the station 16 side. Here, it is possible to judge that the two values are "equal" or substantially equal, even if they are not completely identical, as long as it is assumed that the difference of two values is derived from the measurement errors of the first and the second flowmeters 26 and 52. Such a range of error is stored in the memory inside the control unit 24 in advance as a value set in accordance with the flow rate.

In the abovementioned step S42, if it is judged that the vehicle side integrated value Fveh and the station side integrated value Fsta are equal, it is then determined in the following step S20, whether or not hydrogen has been filled to the fuel tank 34 to the target pressure. If the judgment is NO, each of the respective abovementioned steps S40, S16, S42 and S20 will be repeated until the target pressure is reached. Then, if it is determined that hydrogen has been filled to the target pressure in step S20, in step S22, the first open-close valve 22 and the second open-close valve 50 are closed to end the hydrogen filling.

On the other hand, if it is not judged that the vehicle side integrated value Fveh and the station side integrated value Fsta are equal in the abovementioned step S42, it is judged in step S24 that hydrogen leakage has occurred, immediately closing the first and the second open-close valves 22 and 50 in step S26 to stop the hydrogen filling. In this case, occurrence of hydrogen leakage is preferably notified by an alarm, such as voice, display, and the like.

Accordingly, in the fuel leakage detection system 12 of the third embodiment, since the integrated value Fsta of the hydrogen flow rate measured on the station 16 side and the integrated value Fveh of the hydrogen fill volume measured on the vehicle 14a side are monitored while hydrogen filling is performed, accurate detection at an early stage is possible in the event of hydrogen leakage.

The fuel leakage detection system according to the present invention is not limited to the configuration of the abovementioned respective embodiments, and various alterations and improvements thereof are possible.

For example, the configuration of the fuel leakage detection system 11 of the second embodiment may be used in combination with the fuel leakage detection system 10 of the first embodiment. That is, the fuel leakage judgment using the differential pressure threshold value Pthr may be conducted concurrently with the judgment using volume difference threshold value Fthr such that hydrogen filling is stopped in the case where it is judged that fuel leakage has occurred in accordance with either one of the routines.

Further, the control unit of the fuel leakage detection system may accumulate and store hydrogen filling data, and create and update a database to allow setting of threshold values and the like in accordance with vehicle type or for an individual vehicle, for example.

Description of Reference Numerals 10, 11, 12 fuel leakage detection system, 14, 14a vehicle, 16, 16a hydrogen supply station, 18 nozzle, 20 hydrogen supply path, 22 first open-close valve, 24 control unit, 26 first flowmeter, 28 first communication device, 30 receptacle, 32 hydrogen filling pipe, 34 fuel tank, 35 inlet, 36 open-close valve, 38 hydrogen supply pipe, 40 temperature sensor, 42 filling communication ECU, 44 (second) pressure sensor, 46 second communication device, 48 (first) pressure sensor, 50 second open-close valve, 52 second flowmeter

The invention claimed is:

1. A fuel leakage detection system provided in a fuel supply station for detecting fuel leakage when filling fuel into an onboard fuel tank from a filler port of a vehicle via a fuel supply part, comprising:
    a communication part for acquiring data relating to fuel filling of the onboard fuel tank from a vehicle side when the fuel supply part is connected to the filler port;
    a fuel flow rate measurement part, provided in a fuel supply path part on an upstream of the fuel supply part, for measuring a flow rate of fuel flowing to the fuel supply part;
    a fuel flow-out permission part for permitting/stopping the outflow of fuel to the fuel supply part; and
    a control unit for controlling the fuel flow-out permission part, wherein
    the control unit further comprises a fuel leakage detection part for detecting fuel leakage when filling fuel to the vehicle based on the fuel flow rate acquired by the fuel flow rate measurement part and on data relating to fuel filling acquired from the vehicle side via the communication part, and the fuel flow-out permission part stops outflow of fuel to the fuel supply part when fuel leakage is detected by the fuel leakage detection part.

2. The fuel leakage detection system according to claim 1, wherein
    the data relating to fuel filling comprises a tank temperature detected during fuel filling by a temperature sensor provided at the onboard fuel tank, and a tank pressure detected during fuel filling by a pressure sensor provided in the vicinity of an inlet of the onboard fuel tank, and the tank temperature and tank pressure are transmitted to the communication part via an onboard transmission part.

3. The fuel leakage detection system according to claim 2, wherein
    the fuel leakage detection part derives an estimated fill volume of fuel based on the tank temperature and tank pressure, and the fuel leakage detection part judges that fuel leakage has occurred if a difference between the fuel flow rate measured by the fuel flow rate measurement part and the estimated fill volume exceeds a predetermined volume difference threshold value.

4. The fuel leakage detection system according to claim 1, further comprising a first pressure sensor for detecting a fuel supply pressure during fuel filling on an upstream side of the fuel supply part, wherein the data relating to fuel filling includes a tank pressure detected by a second pressure sensor provided in the vicinity of the inlet of the onboard fuel tank, and the fuel leakage detection part judges that fuel leakage has occurred if a differential pressure between a detected value of the first pressure sensor and a detected value of the second pressure sensor is less than a predetermined differential pressure threshold value.

5. The fuel leakage detection system according to claim 4, wherein
the predetermined differential pressure threshold value is a value transmitted from the vehicle side which is specific to that vehicle, and is equal to a pressure loss arising in a pipe between the filler port and the onboard fuel tank.

6. A fuel leakage detection method for detecting fuel leakage when filling fuel into an onboard fuel tank from a filler port of a vehicle via a fuel supply part at a fuel supply station, comprising the steps of:
    acquiring data relating to fuel filling of the onboard fuel tank from a vehicle side by communication when the fuel supply part is connected to the filler port;
    acquiring a fuel flow rate toward the fuel supply part that is measured by a fuel flow rate measurement part provided on a fuel supply path on an upstream side of the fuel supply part;
    detecting fuel leakage when filling fuel into a vehicle based on the fuel flow rate and data relating to the fuel filling; and
    stopping fuel outflow to the fuel supply part when occurrence of the fuel leakage has been detected.

7. The fuel leakage detection method according to claim 6, wherein
the data relating to fuel filling includes a tank temperature and tank pressure of the onboard fuel tank during the fuel filling, and the tank temperature and tank pressure are transmitted to the fuel supply station side from the vehicle side.

8. The fuel leakage detection method according to claim 7, wherein
the step of detecting the fuel leakage derives an estimate fuel fill volume based on the tank temperature and tank pressure, and judges that fuel leakage has occurred when a difference between the fuel flow rate and the estimated fill volume exceeds a predetermined volume difference threshold value.

9. The fuel leakage detection method according to claim 6, further comprising a step for acquiring a fuel supply pressure during fuel filling detected on an upstream side of the fuel supply part, wherein the data relating to fuel filling includes a tank pressure during fuel filling that is detected in the vicinity of an inlet port of the onboard fuel tank, wherein the step for detecting fuel leakage judges that fuel leakage has occurred, if the difference between the fuel supply pressure and the tank pressure is less than a predetermined differential pressure threshold value.

10. The fuel leakage detection method according to claim 9, wherein
the predetermined differential pressure threshold value is a value transmitted from the vehicle side which is specific to that vehicle, and is equal to a pressure loss arising in a pipe between the filler port and the onboard fuel tank.

* * * * *